E. H. KINDL.
UNLOADING APPARATUS.
APPLICATION FILED FEB. 29, 1912.

1,058,306.

Patented Apr. 8, 1913.

5 SHEETS—SHEET 1.

WITNESSES

INVENTOR

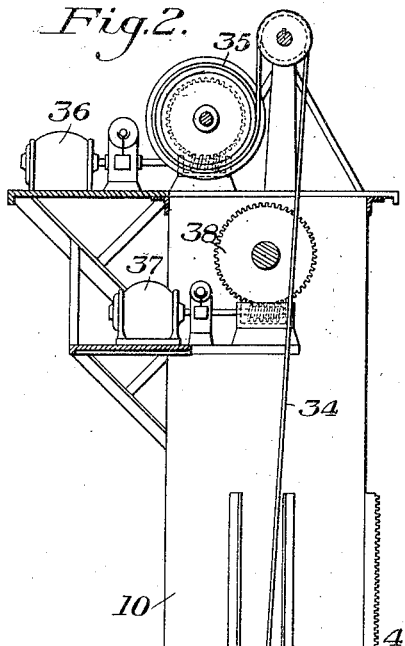
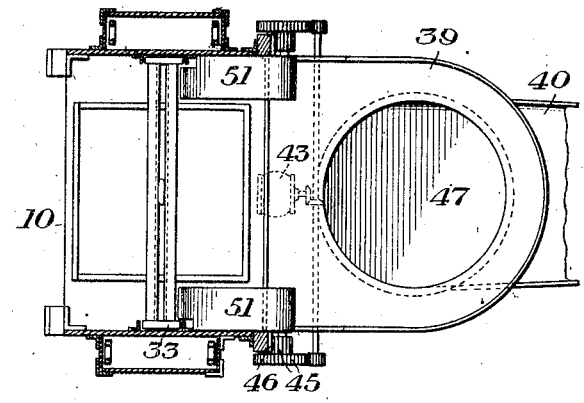
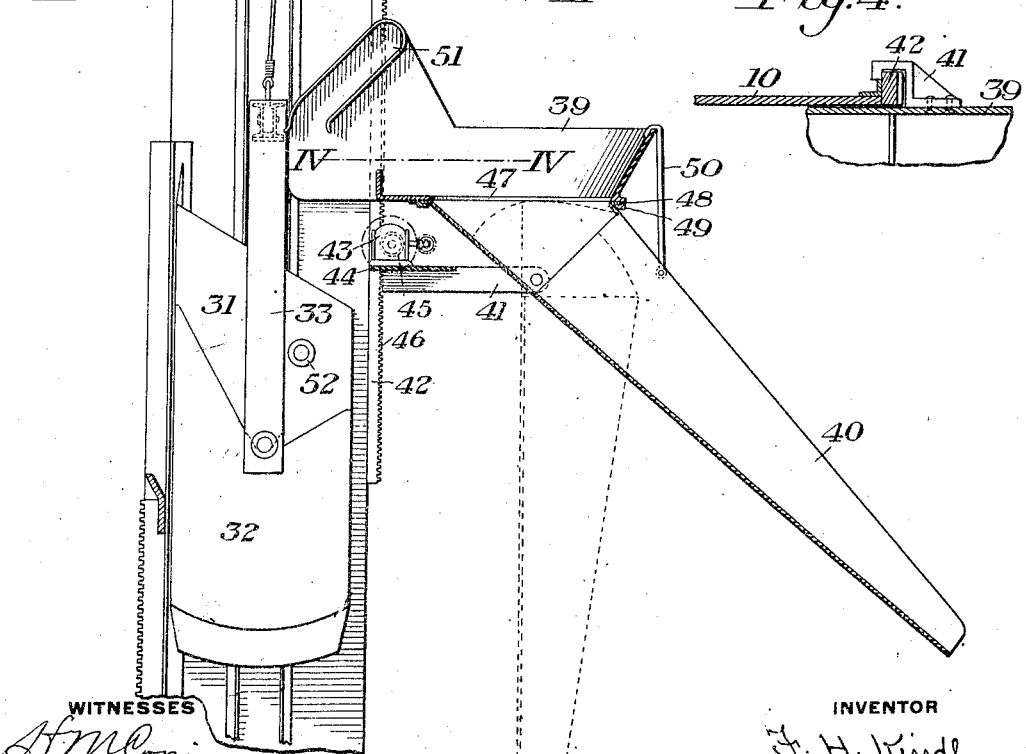

F. H. KINDL.
UNLOADING APPARATUS.
APPLICATION FILED FEB. 29, 1912.

1,058,306.

Patented Apr. 8, 1913.
5 SHEETS—SHEET 3.

WITNESSES
INVENTOR
F. H. Kindl

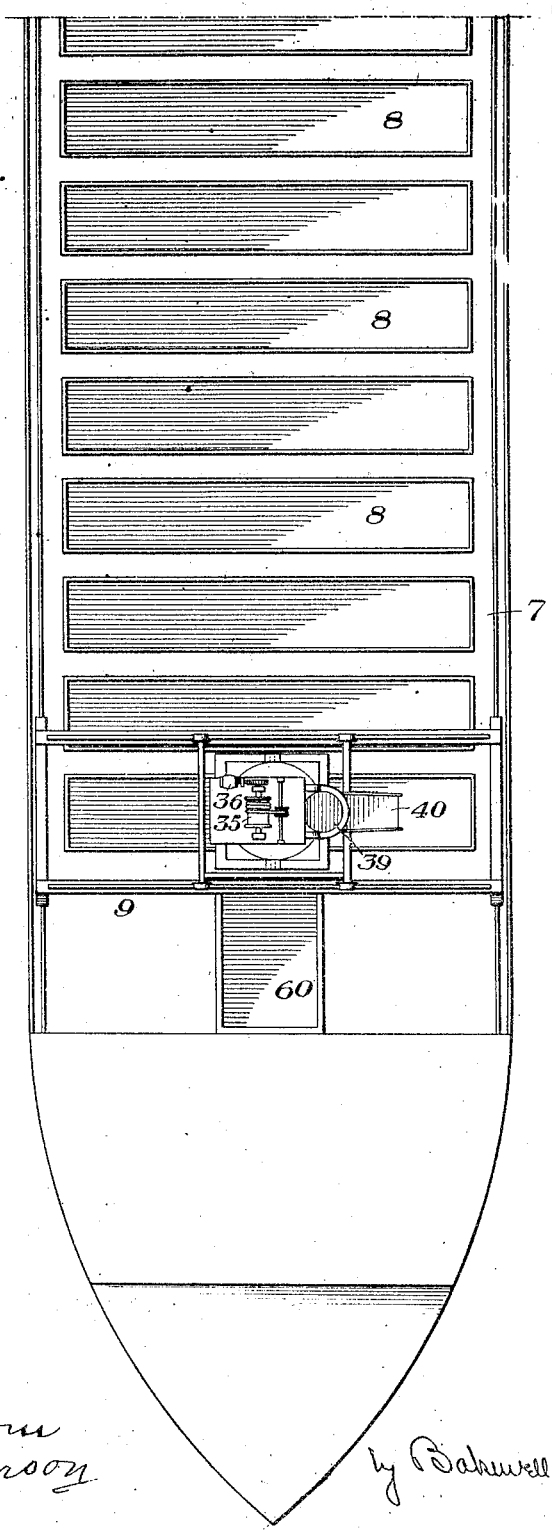

F. H. KINDL.
UNLOADING APPARATUS.
APPLICATION FILED FEB. 29, 1912.
1,058,306.
Patented Apr. 8, 1913.
5 SHEETS—SHEET 5.
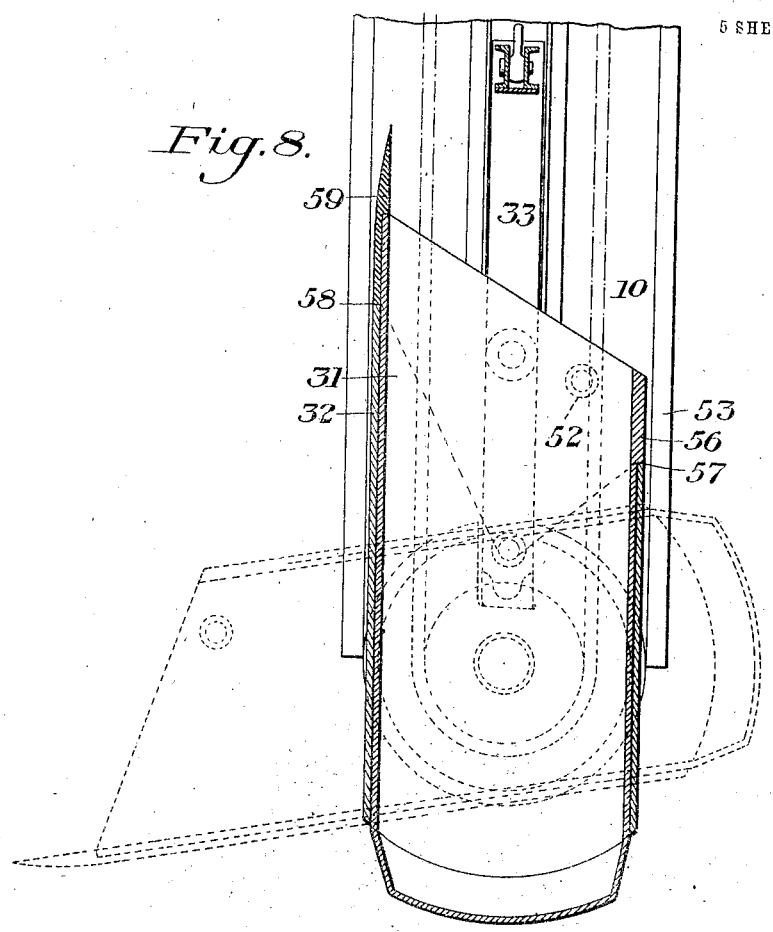
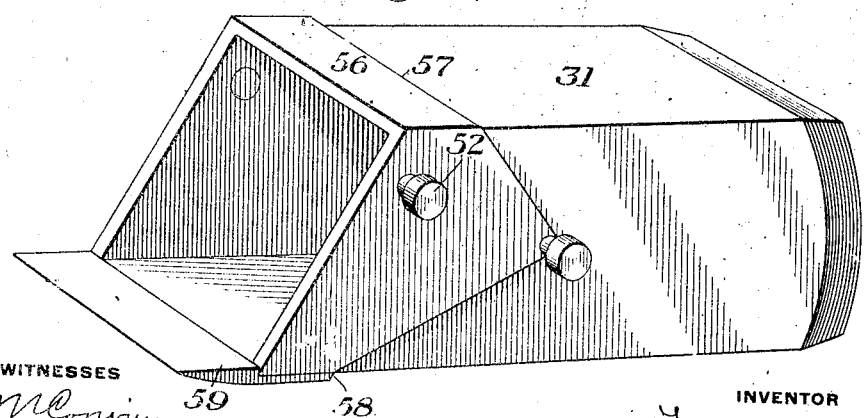

UNITED STATES PATENT OFFICE.

FREDERICK H. KINDL, OF PITTSBURGH, PENNSYLVANIA.

UNLOADING APPARATUS.

1,058,306.  Specification of Letters Patent.  Patented Apr. 8, 1913.

Application filed February 29, 1912. Serial No. 680,756.

*To all whom it may concern:*

Be it known that I, FREDERICK H. KINDL, of Pittsburgh, Allegheny county, Pennsylvania, have invented a new and useful Unloading Apparatus, of which the following is a full, clear, and exact description, reference being had to the accompanying drawings, forming part of this specification, in which—

Figure 1:
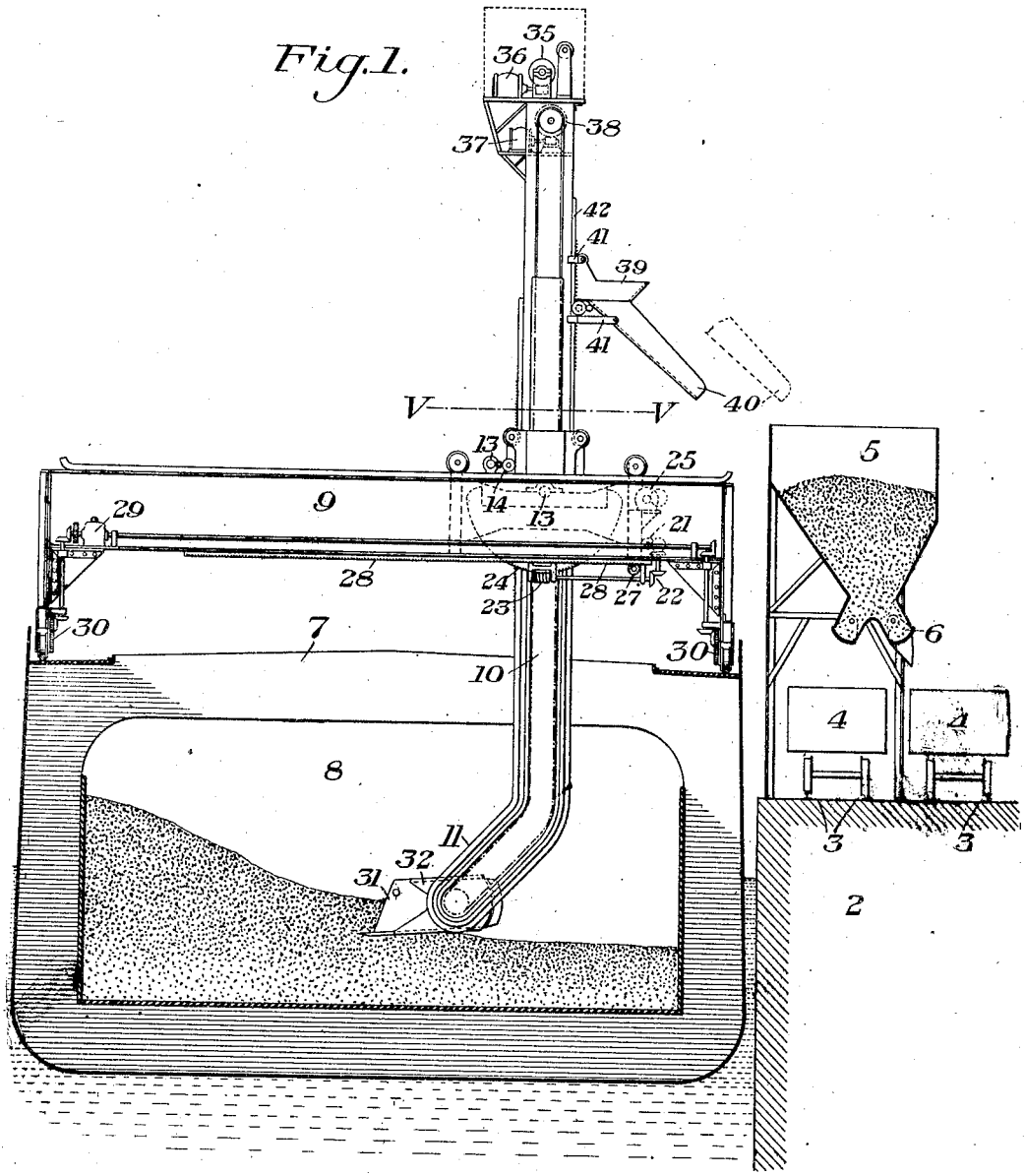
Figure 5:
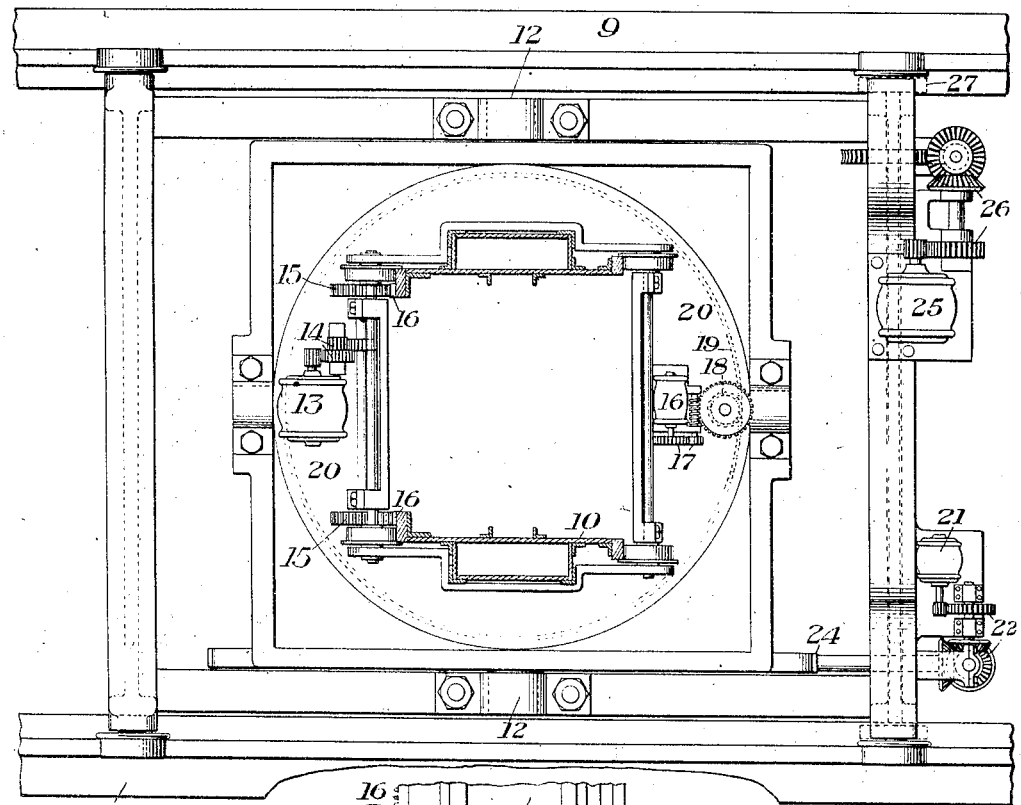
Figure 6:
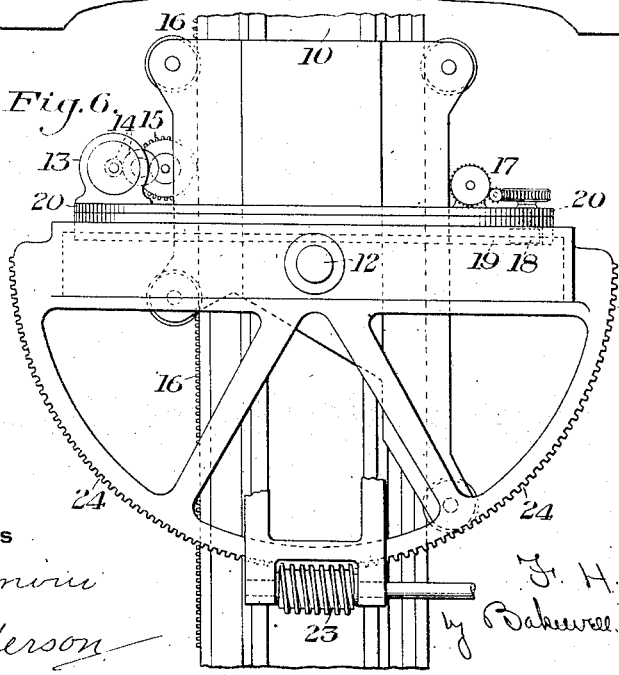

Figure 1 is a vertical elevation, partly in section, and partly conventional, showing apparatus embodying my invention; Fig. 2 is a vertical section of the leg and spout; Fig. 3 is a section on the line III—III of Fig. 2; Fig. 4 is a section on the line IV—IV of Fig. 2; Fig. 5 is a section on the line V—V of Fig. 1; Fig. 6 is a side view of a portion of the leg, and of the gearing for actuating the same; Fig. 7 is a plan view showing a portion of a vessel having unloading apparatus supplied thereto; Fig. 8 is a vertical section of the lower portion of the leg in modified form, and also showing a modified form of bucket and holder; and Fig. 9 is a perspective view of the bucket of Fig. 8 removed from the holder.

My invention has relation to unloading apparatus, and more particularly to apparatus for unloading granular or lump material such as ore, from boats or vessels.

In my prior Patent No. 711,772, dated October 21st, 1902, I have described and claimed unloading apparatus of the general character of that forming the subject of the present application. The apparatus of my said patent was shown as especially arranged to be used in the unloading of boats or vessels by being carried on an overhung beam supported on the dock or landing adjacent to the vessel, and upon which the unloading apparatus proper could be moved.

The present invention is designed to provide means whereby the unloading apparatus may be carried directly on and form a part of the equipment of the vessel so as to be available for unloading at any dock or wharf at which it may be desired to use it.

A further object of my invention is to improve the unloading apparatus in certain features, as hereinafter pointed out, whereby its operation is simplified and made more efficient for the particular purpose for which it is especially intended.

In the accompanying drawings, the numeral 2 (Fig. 1), designates a dock or pier, having railroad tracks 3 thereon extending parallel with its water edge. In the present instance two parallel tracks are shown, and upon which cars 4 may be run to receive the material as it is unloaded. 5 designates an elevated bin or hopper having a branch discharge 6. This bin or hopper receives the ore or other material discharged by the unloading apparatus, and in turn discharges it into one or both of the cars 4. It will be understood, however, that the discharge from the unloading apparatus may be received by any suitable apparatus, or may be directed into a pile on the dock or wharf, the arrangement shown being illustrative only.

7 designates a boat or vessel having a plurality of transverse hatchways 8 extending nearly the full width of the vessel. Supported on tracks to span these series of hatchways and to be moved longitudinally of the vessel over any particular hatchway, is a crane structure 9 upon which my unloading apparatus is carried. This unloading apparatus is in general of the character and arrangement shown in my said patent. It comprises a vertical leg 10, which, in Fig. 1, is shown as offset at its lower end portion 11, and which is mounted on the bridge of the crane 9 to be capable of an up and down movement, a rotary movement about a vertical axis, a tilting movement on the trunnions 12, and a transverse back and forth movement on the bridge 9. The vertical movement is effected by means of a motor 13, which, through suitable gearing 14, drives pinions 15, which mesh with suitable vertical racks 16 on the leg structure. (See Figs. 1 and 5.) The rotary movement about a vertical axis is effected by means of a motor 16, which, through a suitable train of gearing 17, drives a pinion 18, which meshes with the teeth of an internal circular rack 19 carried by the leg structure.

As shown in Fig. 5, the two motors 13 and 16 are preferably mounted directly on a turntable 20 of the leg, at diametrically opposite points so as to assist in balancing each other. The tilting movement of the leg is effected by means of the electric motor 21, which, through suitable gearing 22, drives a worm 23, which meshes with the worm teeth of a sector 24 secured to the leg. (See Figs. 1 and 6.) The transverse back and forth movement of the leg is effected by means of an electric motor 25, which through suitable gearing 26, drives pinions 27, meshing with a rack bar 28 on the crane bridge. The traverse of the crane longitudinally of the vessel is effected by means of the electric motor 29 and gearing 30 of the character usually employed for this purpose.

31 designates the unloading bucket, which is arranged to travel within the hollow leg; 32 is the holder with which the bucket is engaged while being filled at the lower end of the leg, as shown in Fig. 1; 33 is the lifting bail for lifting the filled bucket to discharging position, and which is operated by the cable 34, which passes around a winding drum 35, driven by an electric motor 36, the drum 35 and the motor 36 being located at the top of the leg structure.

37 is the motor, and 38 the gearing driven thereby for tilting the bucket holder and bucket into filling position. Except in the particulars hereinafter described, these parts are the same as in my said patent, and do not require specific description here.

39 designates a hopper, into which the bucket 31 is arranged to discharge when elevated into discharging position, and which is provided with the discharge spout 40. The hopper 39 (see Figs. 1, 2, 3 and 4), is provided with brackets 41, which engage vertical guides 42 on the leg structure, and upon which guides said hopper and its spout are vertically movable. This vertical movement is effected by means of an electric motor 43 mounted on the platform 44 below the hopper and connected thereto. This motor drives gearing 45, which meshes with the teeth of a vertical rack 46 on the leg structure. The hopper has a circular discharge opening 47, to which is fitted the circular upper portion of the spout 40, the latter having the flange 48 rotatably fitting a guide 49 on the hopper, whereby the spout may be rotated to different angular positions. The spout preferably has a hinged section, as indicated in Fig. 2, and which can be dropped to the dotted line position shown in said figure when desired. This hinged section is normally supported in discharge position in any suitable way, as by means of the hook 50. The hopper also carries the dumping guides 51, which are designed to be engaged by the dumping roller 52 on the bucket when the bucket is raised into contact therewith. The bucket has one of these rollers at each side; and as these rollers come into engagement with the guides 51 the bucket will be tipped forwardly until it has been raised sufficiently to bring the rollers against the upper closed ends of the guides. Continued upward movement of the bucket will then cause the bucket to turn on the rollers 52 as pivots and effect its discharge. The vertical adjustment of the hopper and spout is of considerable importance to the proper use of the apparatus for unloading vessels, since it necessarily occurs that the height of the vessel with relation to the dock will vary at different times or at different places. In unloading some materials, such as coal, it is desirable that there shall be as little fall or drop of the material as possible, in order to prevent its deterioration or disintegration. By means of the adjustable hopper, the amount of fall or drop can in each case be adjusted to a minimum.

In Figs. 8 and 9 I have shown a modification of the leg, and detail views of the bucket and its holder. In the form shown in these figures, the leg instead of being offset at its lower portion, is straight, as shown at 53. The bucket holder 32 is a shell of general rectangular form, open at both ends, and into which the bucket 31 can slip, as is shown in Fig. 8. The bucket is provided at its forward end with a thickened portion or enlargement 56, which forms the external shoulder 57 at the top and at each side of the bucket, this shoulder being arranged to fit against the open upper or forward end of the holder, as shown. In this manner any opening or space between the bucket or holder into which granular or pulverized material can find its way or be forced is obviated. A similar shoulder 58 may be formed on the bottom of the bucket by means of the cutting edge or plate 59 secured to the bucket.

As before stated, my improved unloading apparatus is designed to be normally carried on the deck of the vessel. For this purpose, the deck is provided with an additional hatchway 60 (see Fig. 7) at some convenient point, through which the leg can be lowered into the hold for storage while the vessel is in transit. By mounting the unloading apparatus on a crane which is movable longitudinally of the vessel, and the unloading apparatus being movable transversely upon the crane, it will be apparent that not only all the hatchways of the vessel, but every portion of each hatchway can be reached to the best advantage in effecting the complete unloading of the vessel. The vertical movement of the leg which is provided is sufficient to enable it to be raised far enough to clear the solid deck portions between the hatchways in moving longitudinally from one hatchway to another. The tilting movement of the leg, as well as the tilting movement of the bucket and its holder, enables the bucket to be forced into the material at the most effective angle; the rotary movement of the leg about a vertical axis enables all parts of the vessel's hold to be reached, including the corner portions; while the adjustable spout, as before stated, provides for a minimum drop or fall of the discharged materal.

It will be obvious that various changes can be made in the details of construction and arrangement of the parts whereby these several movements are effected without departing from the spirit and scope of my invention as defined in the appended claims.

What I claim is:—

1. Apparatus of the character described, comprising tracks, a crane mounted for longitudinal movement on said tracks, and unloading apparatus mounted for transverse movement on the crane, said unloading apparatus comprising a vertical leg, supporting means for said leg mounted on the crane and through which the leg is vertically movable, a motive device for tilting the support and leg, and means for moving the leg vertically through the support; substantially as described.

2. Apparatus of the character described, comprising tracks, a crane mounted for longitudinal movement on said tracks, and unloading apparatus mounted for transverse movement on the crane, said unloading apparatus comprising a vertical leg, supporting means for said leg mounted on the crane and through which the leg is vertically movable, a motive device for tilting the support and leg, and means for moving the leg vertically through the support, together with means whereby said leg may be rotated about its vertical axis, and hoisting mechanism carried by the leg; substantially as described.

3. Apparatus of the character described, comprising tracks, a crane mounted for longitudinal movement on said tracks, and unloading apparatus mounted for transverse movement on the crane, said unloading apparatus comprising a vertical leg, a support for said leg mounted on the crane, a motive device for raising and lowering the leg through its support, means for rotating the leg about its vertical axis, and a bucket hoisting mechanism carried by the leg; substantially as described.

4. In unloading apparatus of the character described a movable crane, a depending leg mounted on the crane for vertical movement, a bucket movable up and down inside the leg, and a hopper and spout structure mounted for vertical movement on the leg; substantially as described.

5. In unloading apparatus of the character described a movable crane, a depending leg mounted on the crane for vertical movement, a bucket movable up and down inside the leg, a hopper structure mounted for vertical movement on the leg, and a motor for moving said structure; substantially as described.

6. In unloading apparatus of the character described a movable crane, a depending leg mounted on the crane for vertical movement, a bucket movable up and down inside the leg, a hopper structure mounted for vertical movement on the leg, and a motor for moving said structure; together with a discharge spout attached to the hopper structure and rotatably connected therewith; substantially as described.

7. In unloading apparatus of the character described a movable crane, a depending leg mounted on the crane for vertical movement, a bucket movable up and down within the leg, a hopper structure to receive the discharge from said bucket and mounted on the leg for vertical movement, and means carried by said hopper structure and movable therewith to coöperate with the bucket to effect the discharge movement thereof; substantially as described.

8. In unloading apparatus, the combination with a depending leg having a movable holding device in its lower portion, said holding device having an open end, of a bucket or scoop adapted to be engaged and held by the holding device, the bucket having an exterior shoulder to fit the open end of the holding device; substantially as described.

9. Apparatus of the character described, comprising tracks, a crane mounted for longitudinal movement on said tracks, and unloading apparatus mounted for transverse movement on the crane, said unloading apparatus comprising a vertical leg movable vertically through the crane, and having a pivotal support thereon, said leg being also rotatable about a vertical axis, a motor for effecting the tilting movement of the leg, and another motor for effecting its rotary movement, said motors being carried by the leg at opposite sides thereof and having a balancing action; substantially as described.

10. Apparatus of the character described, comprising tracks, a crane mounted for longitudinal movement on said tracks, and unloading apparatus mounted for transverse movement on the crane, said unloading apparatus comprising a vertical leg, a pivotal support for the leg mounted on the crane and through which the leg is vertically movable, means for raising and lowering the leg through its support, means for rotating the leg about a vertical axis within the support, a bucket hoisting mechanism carried by the leg, and an adjustable chute also carried by the leg, said chute and bucket having coöperating dumping means; substantially as described.

In testimony whereof, I have hereunto set my hand.

FREDERICK H. KINDL.

Witnesses:
R. M. CONWAY,
H. M. CORWIN.